(12) United States Patent
Klein

(10) Patent No.: US 7,103,661 B2
(45) Date of Patent: Sep. 5, 2006

(54) AUTO CONFIGURATION OF PORTABLE COMPUTERS FOR USE IN WIRELESS LOCAL AREA NETWORKS

(76) Inventor: John Raymond Klein, 220 La Via Azul Ct., Morgan Hill, CA (US) 95037

( * ) Notice: Subject to any disclaimer, the term of this patent is extended or adjusted under 35 U.S.C. 154(b) by 903 days.

(21) Appl. No.: 09/803,203

(22) Filed: Mar. 9, 2001

(65) Prior Publication Data

US 2002/0007407 A1      Jan. 17, 2002

Related U.S. Application Data

(60) Provisional application No. 60/236,981, filed on Sep. 29, 2000, provisional application No. 60/217,796, filed on Jul. 12, 2000.

(51) Int. Cl.
*G06F 15/173* (2006.01)

(52) U.S. Cl. .............. 709/225; 709/222; 713/201; 726/3; 726/5; 726/6

(58) Field of Classification Search ............... 713/201; 709/229, 222, 225; 711/150; 726/3–6
See application file for complete search history.

(56) References Cited

U.S. PATENT DOCUMENTS

| | | | | |
|---|---|---|---|---|
| 5,740,160 A | * | 4/1998 | Ikegami et al. ............ 370/255 |
| 5,907,544 A | * | 5/1999 | Rypinski ................... 370/337 |
| 6,128,661 A | * | 10/2000 | Flanagin et al. ........... 709/227 |
| 6,144,855 A | * | 11/2000 | Slovin .................... 455/432.1 |
| 6,157,953 A | * | 12/2000 | Chang et al. ............. 709/225 |
| 6,188,681 B1 | * | 2/2001 | Vesuna ..................... 370/338 |
| 6,295,556 B1 | * | 9/2001 | Falcon et al. ............. 709/220 |
| 6,330,244 B1 | * | 12/2001 | Swartz et al. ............. 370/401 |
| 6,332,077 B1 | * | 12/2001 | Wu et al. ................. 455/432.1 |
| 6,680,923 B1 | * | 1/2004 | Leon ........................ 370/328 |
| 6,693,888 B1 | * | 2/2004 | Cafarelli et al. ........... 370/338 |
| 6,708,033 B1 | * | 3/2004 | Linkola et al. ........... 455/440 |
| 2001/0023446 A1 | * | 9/2001 | Balogh ..................... 709/229 |

OTHER PUBLICATIONS

IEEE P802.11 Draft Standard for Wireless LAN Medium Access Control (MAC) and Physical Layer (PHY) Specification (May 20, 1996).

* cited by examiner

Primary Examiner—Ayaz Sheikh
Assistant Examiner—Pramila Parthasarathy
(74) Attorney, Agent, or Firm—Williams, Morgan & Amerson

(57) ABSTRACT

A method and apparatus for the configuration of a wireless network adapter is disclosed. A wireless network adapter is provided with software that enables the adapter to recognize and connect with one or more networks. Software profiles are loaded onto or created on the adapter. The software profiles each correspond to a unique network.

15 Claims, 15 Drawing Sheets

AUTO CONFIGURATION OF PORTABLE COMPUTERS FOR USE IN WIRELESS LOCAL AREA NETWORKS

CROSS REFERENCE TO RELATED APPLICATIONS

This application claims the priority of U.S. Provisional Patent Application 60/236,981 filed on Sep. 29, 2000 and U.S. Provisional Patent Application 60/217,796 filed on Jul. 12, 2000.

FIELD OF THE INVENTION

This invention relates to wireless local area networks, and more particularly to auto configuration software for use in portable computers communicating with wireless local area networks.

BACKGROUND OF THE PRIOR ART

Wireless local area networks (WLANs) use infrared (IR) or radio frequency (RF) communications channels to communicate between portable or mobile computer terminals and stationary access points or base stations. These access points are connected by wired or wireless communication channels to a network infrastructure which connects groups of access points together to form a local area network (LAN), which can include one or more host computers. In turn, the LAN can be connected to another larger network such as the Internet and the World Wide Web (Web). Several protocols, including the IEEE 802.11 standard, "Wireless LAN Medium Access Control (MAC) and Physical Layer (PHY) Specifications" have been designed to standardize WLAN communications. Such standardization is useful for optimizing user requirements, including spatial layout, response time, loading and throughput requirements of the network.

"Roaming" terminals are mobile units that can associate with any access point (AP) associated with a WLAN and seamlessly move from AP to AP. Each roaming terminal analyzes received signals from access points in its vicinity and associates with a single access point. Communication with an access point connects a terminal with the LAN and therefore with external networks such as the Internet. The region around an access point can be referred to as a "cell". Roaming terminals can move from cell to cell and remain connected to the LAN and any other network to which the LAN has connected.

The IEEE 802.11 standard is one protocol used for WLAN communications. Typically, a mobile unit must be configured by hand by the manual entry of network and user parameters in order to be able to communicate with an access point. Once configured, each unit must be reconfigured if it is to communicate with another WLAN. Furthermore, each access point is associated with a finite number of frequency channels. Often, there can be several unrelated WLANs in a dense area such as an office building. These unrelated WLANs, or other RF communication systems, may use the same frequencies. Therefore it is possible for a mobile unit associated with one WLAN to pick up a communications interference with an unrelated WLAN. This situation is not desirable. Therefore, even if a roaming unit is to have the broadest possible communication coverage with an associated WLAN, unauthorized users from unrelated WLANs can possibly breach the communication link.

However, many users of roaming terminals expect to connect to multiple unrelated WLANs that do not create a security breach. For example, a company may have multiple offices around the world with a WLAN in every office. In such a situation, an employee of the company may want to use one roaming unit in several of the offices. The ability to connect to several unrelated WLANs requires a different configuration. However, it is burdensome to have to reconfigure the terminal each time the user desires to use the terminal with a different WLAN. Furthermore, if there are several roaming terminals for the several WLANs, attended installation of a new configuration is required for each of the terminals.

SUMMARY

The present invention provides an auto configuration method and apparatus for seamless connection of a single terminal to numerous different WLANs. The method and apparatus also allow an unattended installation for a large number of wireless clients.

In general, in one aspect, the invention features a software-implemented method of configuring a computer to associate with a network through a wireless communication link. The method includes creating a computer profile corresponding to a network having an Extended Service Set identifier, using the computer profile to cause the computer to recognize the network and creating a communication link between the computer and the network.

Implementations may include one or more of the following advantages. Variable network parameters such as encryption key status, frequency and power requirements may be used to create the computer profile. The software may be integrated into the operating system of the computer. Data passing over the communication link between the computer and the network may be encrypted. The computer may be programmed to contain multiple profiles to recognize and connect with multiple unrelated networks. The name of a selected profile may be stored for use by other programs.

Once profiles that define a communications link between a remote unit and a WLAN are established, they are stored, encrypted and can be password protected.

WLAN service providers can create profiles away from the client computer and load the profiles on a network such as the Internet. A customer signing up for service can download the profiles and store on their computer. Users who download can't change the encryption that creates a default security system.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Figure 1:
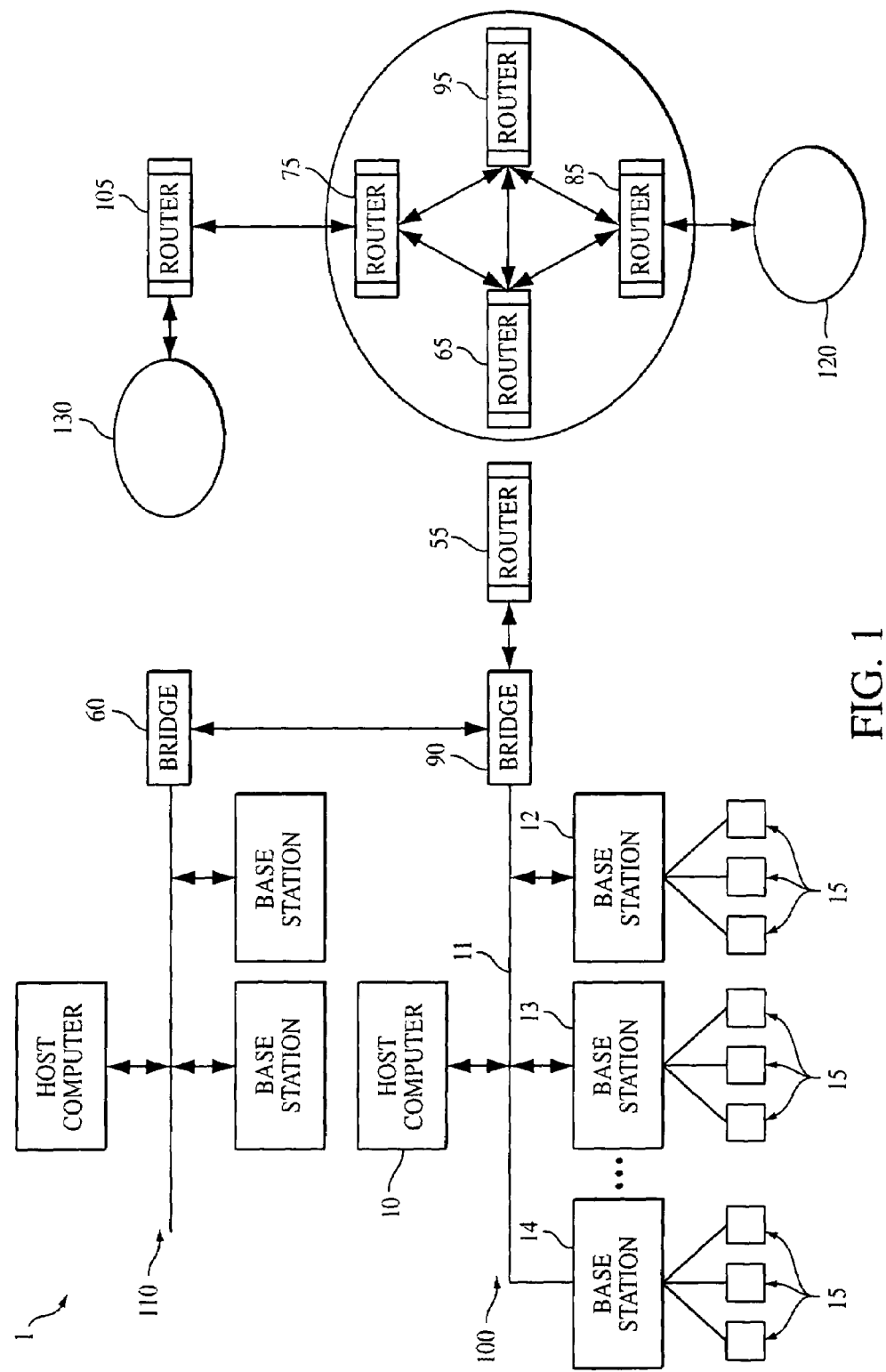
FIG. 1 illustrates a network environment in which the present invention operates.

FIG. 1 illustrates an exemplary network environment 1 having numerous nodes. A first LAN 100 includes a host processor 10 connected by a wired communications link 11 that is connected to a number of stationery access points or base stations 12, 13. In one embodiment, communications link 11 can be a serial or parallel type port such as RS-232, general-purpose interface bus (GPIB), USB or any other similar bus. In LAN applications, the link 11 can be Ethernet, token ring or any other network protocol. Another base station 14 can be coupled to the host through the base stations 12, 13 or by a radio frequency (RF) link 11a. Each one of the base stations 12, 13, 14 is coupled to a number of mobile units or terminals 15. The mobile units can be any of a variety of hand held units such as battery operated data terminals or voice communications handsets. Various other types of remote terminals can be employed in the network environment, including data entry facilities such as keyboards and the like, as well as a display or a printer for indicating to a user information detected, transmitted and/or received by the terminals 15.

The network can have a large number of base stations, typically up to sixty-four, and several hundred remote units 15. Furthermore, the first LAN 100 may be coupled to additional LANs 110, 120, 130 through controllers such as bridges 50, 60 or routers 55, 65, 75, 85, 95, 105. Other typical embodiments for the remote units 15 as a WLAN adapter include but are not limited to hand-held devices for network access to enable a user to receive personal itinerary such as airline e-tickets, hotel confirmation information, credit card, bank account or brokerage account access and the like.

This network environment 1 can also be used for any facility having the need for a number of remote units to access a central control station such as a LAN 100. Such facilities can be but are not limited to a manufacturing facility, office building complex, warehouse, retail establishment, or like commercial facilities, or combination of facilities where bar code readers, for example, or similar data-gathering terminals are used for inventory control in stockroom or receiving/shipping facilities, at check out (point of sale) counters, for reading forms or invoices or the like, for personal security checking at gates or other check-out points, at time clocks, for manufacturing or process flow control, and other similar uses. The bar code readers may be hand-held laser-scan type bar-code readers or bar-code readers of the wand-type. The readers may be stationary rather than hand-held. The device may be of the optical character recognition (OCR) type as well. Other types of data gathering devices may implement features such as temperature or pressure measuring devices, event counters, voice or sound activated devices, intrusion detectors and the like.

Figure 2:
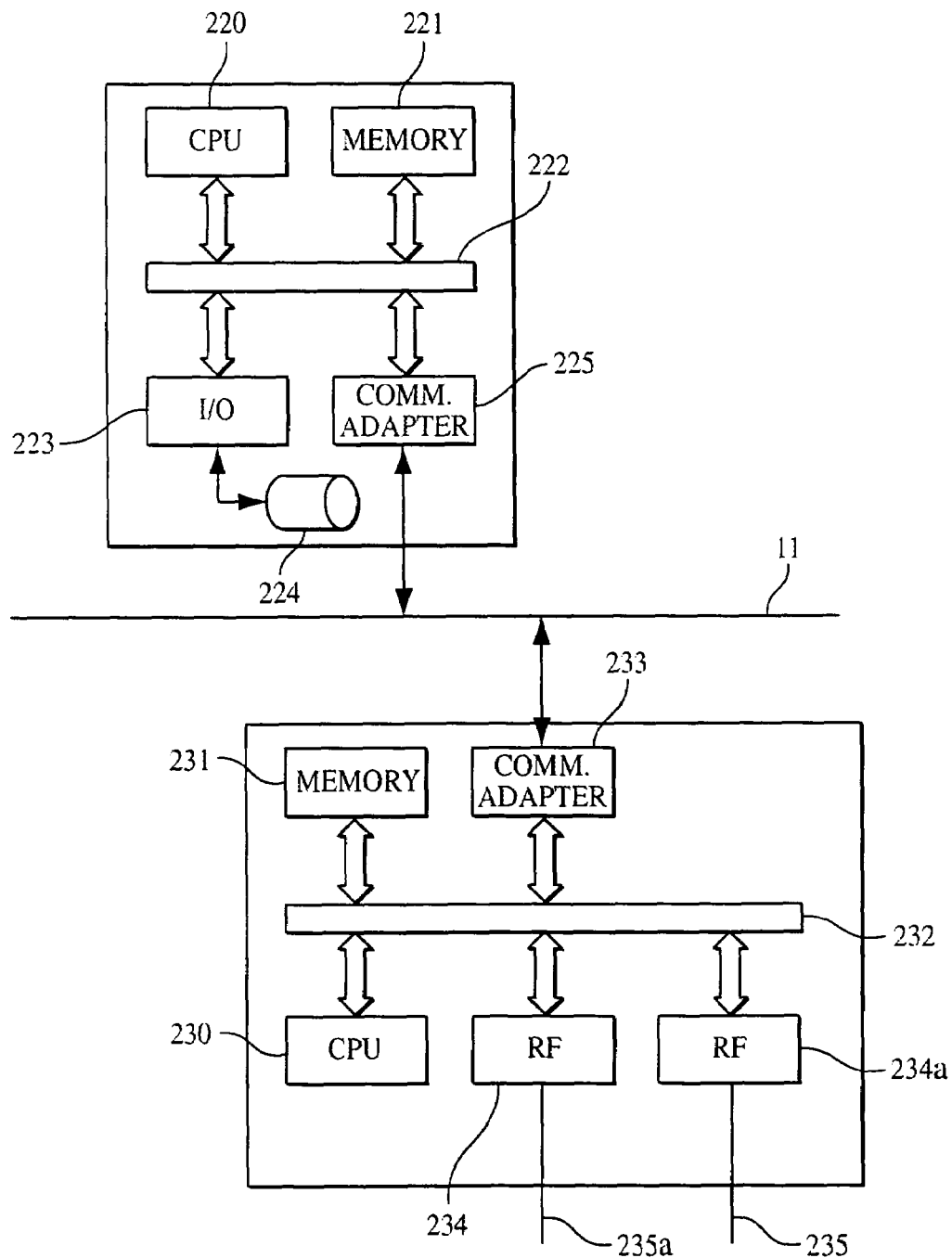
FIG. 2 illustrates a system level view of a host computer and a base station in the network.

FIG. 2 illustrates a detailed view of a host computer 10 and a base station 12, 13, 14 of FIG. 1. The host computer 10 includes a central processing unit (CPU) 220 that is connected to a memory 221 through a bus 222. An I/O module 223 connects the host computer to various devices such as a keyboard, video display and other peripherals. Disk storage 224 is also connected to the I/O module 223. A communications adapter 225 connects the CPU 20 through the bus 222 to the communications link 11.

The base stations 12, 13, 14 each utilize a CPU 230 connected to a memory 231 through a bus 232. A communications adapter 233 connects the bus 232 to the communications link 11. An RF transceiver 234 is connected to the CPU 230 in each base station 12, 13, 14 through the local bus 232 and is connected to an antenna 235 for RF transmission to and reception from the remote units 15 using a transmit/receive exchange protocol. In one embodiment, the exchange protocol is similar to a collision-sense multiple access (CSMA) protocol. A detailed discussion of this exchange protocol is presented below with respect to FIG. 3. An additional RF transceiver 234a can be used as an RF link to and from other base stations, using antenna 235a, if necessary.

Base stations 12, 13, 14 are typically stationary units that use line power and are often not accessible to an operator. The RF signal path in a typical environment is changeable because equipment in the environment may move around as the locations of the remote units 15 change. As a result, the particular base station that is in communication with a particular remote unit 15 can change. In an implementation, a "hand-off" protocol is used to change the base station that is designated to communicate with the remote unit 15. In this manner, a remote unit 15 has a confirmed virtual link with only one base station at a time, although other base stations may be in range. The base stations 12, 13, 14 act as intermediaries for the communication link between the remote unit 15 and the host computer 10. The main function of the base stations 12, 13, 14 is to relay data between the remote units 15 and the host computer.

Figure 3:
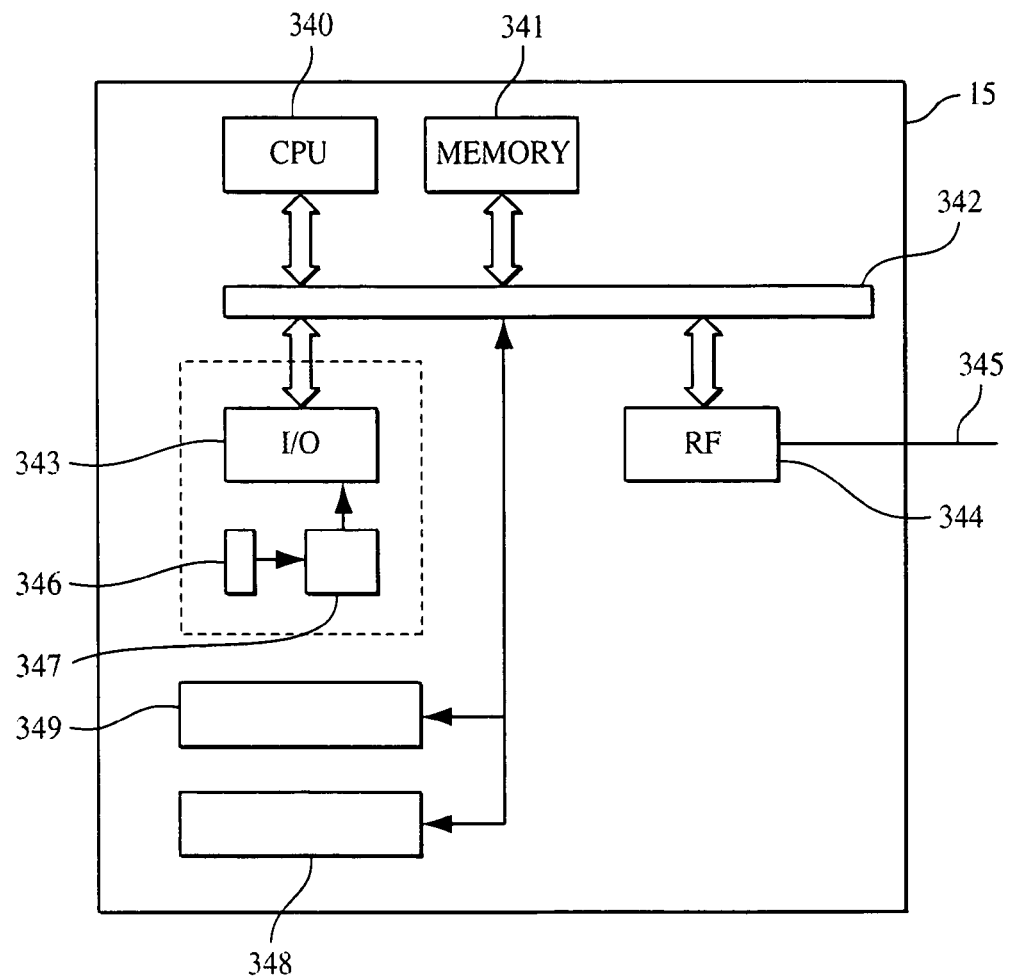
FIG. 3 illustrates a system level view of a mobile unit.

FIG. 3 illustrates a detailed view of a remote unit 15. The remote unit 15 includes a CPU 340 connected to a local bus 342. A memory 341 is also connected to the local bus 342, and can provide instructions to the CPU 340. A peripheral bar code data acquisition device 343 is optionally coupled to the CPU over the bus 342. The device 343 can be used to detect and/or convert data from a bar code (not shown). The device 343 can be used to input data from a photodetector device 346 that produces a serial electrical signal fed to a code recognition circuit 347 responding to the characteristic patterns of bar code symbols and providing bar code data to the memory 341 using I/O interface 343 when a bar code is scanned. The bar code data can be moved to memory by a variety of techniques such as direct memory access (DMA) or CPU instructions. Ultimately the bar code data is transferred to an RF transceiver 344 for transmission to a base unit 12, 13, 14 and ultimately the host computer 10. The RF transceiver 344 is coupled to and controlled by the CPU through the bus 342, and transmits the coded RF signal through an antenna 345 or detects and converts RF signals received by the antenna 345.

Typically, the remote unit 15 has a manual entry device 348 such as a keyboard, and a visual display 349 such as an liquid crystal display (LCD) device. The elements of the entry device 348 and the display 349 are scanned by signals generated in the CPU 340, or generated in a entry device and display I/O controller. In one embodiment, the I/O controller is an Intel® 8052 microcontroller.

As discussed above, in one embodiment, a transmit/receive exchange protocol is used by the remote unit 15 to communicate with the base units 12, 13, 14. The exchange protocol is similar to a collision-sense multiple access (CSMA) protocol. The remote unit 15 first listens before transmitting, and does not transmit if the channel is not free. If an RF channel is quiet a transceiver in the remote unit 15 can start a transmission. A transceiver in the remote unit 15 typically begins a data exchange at its own initiative by first listening for other traffic for a brief time interval $t_0$, and, if the RF channel is quiet, starting a transmission at a time of its own selection. An outgoing transmission data packet lasts for a certain time interval $t_1$, then at a precise time delay $t_2$ after the mobile unit 15 starts its transmission, the transceiver 344 begins listening for a return data packet from the base stations 12, 13, 14. The remote unit 15 waits for a very small time interval $t_3$ for this return, or "acknowledge" packet. If this packet is not returned during the time interval $t_3$, the remote unit 15 ignores any data packets that follow. Because the mobile units 15 control the data exchange between the remote units 15 and the base stations 12, 13, 14, the CPU 340 handles all exchange related tasks including data input from the bar code scanner 343, keyboard and display scans, RF control, data stream transfers to and from the RF transceiver, and data coding and encoding. The remote unit 15 is therefore the primary controller of RF transmission and reception. The remote units 15 send a periodic data packet, having no data, to the base stations 12, 13, 14 in case the base stations 12, 13, 14 have data to transmit to the remote units 15.

As discussed above, the mobile unit 15 can be a portable computer. The portable computer can be used for a variety of computing purposes including but not limited to Internet access, word processing, scheduling, mathematical computation and the like. For these purposes, the portable computer is loaded with an operating system. In an embodiment, the operating system can be all Windows 9x and NT platforms. In other embodiments, the operating system can be Windows 2000, Windows CE, Palm 05, Linux, or others. In one embodiment, the memory 341 can be random access memory into which the operating system is loaded. In another embodiment, the memory 341 can be any type of firmware such as EPROM or EEPROM into which the operating system is "burned."

Figure 4:
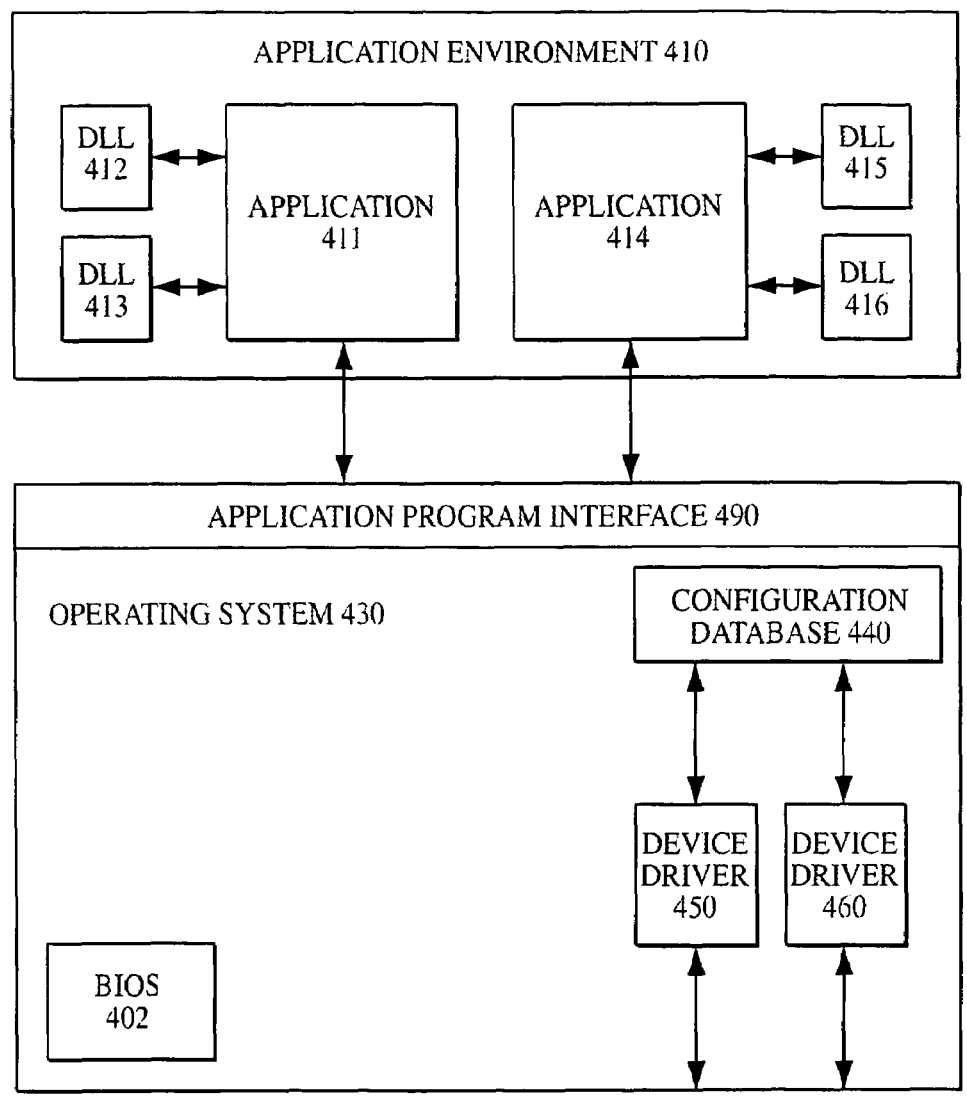
FIG. 4 illustrates an operating system having an application environment.

FIG. 4 illustrates an operating system having an application environment. As discussed above, the operating system 430 can be any one of the various Windows environments. The operating system 430 provides software to manage, configure, enable and allocate physical resources of the mobile unit 15. For example, the operating system 430 may include a memory allocation algorithm to allocate the memory 341 among various software tasks. Additionally, the operating system includes instructions from the memory to control the RF transmissions and receptions, as well as data flow between the code data acquisition device 343 and the RF transceiver 344.

Referring to FIG. 4, an application environment 410 contains one or more software application processes 411, 414. Each application 411, 414 can have a dynamic link library (DLL) 412, 413 and 415, 416 respectively associated with it. A DLL is a feature of Windows® platform that allows executable code modules to be loaded on demand and dynamically linked at run time. Library code can be updated, transparent to the applications 411, 414, and unloaded when no longer needed.

The operating system 430 can include an application programming interface 490 (API). The API 490 is the software that the application processes 411, 414 use to request and carry out lower level services performed by the operating system 430. For Windows®, the API also helps applications 411, 414 manage windows, menus, icons and other graphical user interface (GUI) elements. The API 490 includes a set of standard software interrupts, calls and data formats that applications 411,414 use to initiate contact with device drivers 450,460.

The operating system 430 can include one or more device drivers 450, 460. The device drivers 450, 460 provide control functionality specific to a particular physical device or class of devices. Additionally, the device drivers 450, 460 provide standard software interfaces allowing other system components to access the controlled device. For example, one device driver 450 can control the code data acquisition device 343 and provide data to and from applications 411, 414 through the API 490. The other device driver 460 can control the RF transceiver 344 that allows data to be transferred under the control of operating system 430 to the RF transceiver 344 through device driver 460. Operating system 430 also includes a BIOS 402 to run standard start up routines for the remote unit 15.

A variety of application programs can be loaded into the operating system. One such application is a WLAN auto configuration program. Since the remote unit 15 can be associated with a single WLAN having base stations 12, 13, 14, or multiple unrelated WLANs having multiple unrelated base stations, it is necessary for the mobile unit 15 to be able to configure itself to adapt to and communicate with one or more of several possible WLANs within range. This auto configuration program can enable a user to store configurations for numerous WLANs such that when a user turns on the mobile unit 15, the program automatically loads the correct configuration for the WLAN that the mobile unit 15 is near. As the number of WLANs increase, it is very useful for the user to be able to connect to the WLAN where he is physically located without being required to use the time to manually change the computer's configuration settings to associate with the WLAN and Internet.

In a Windows® implementation, the program includes a window in the Windows environment similar to control panel or Dial-Up networking. The program seamlessly blends into the operating system. The Windows shell uses a single hierarchical name space to organize all objects such as files, storage devices, printers, network resources, and anything else that can be viewed using an application such as Windows Explorer.

Figure 5:
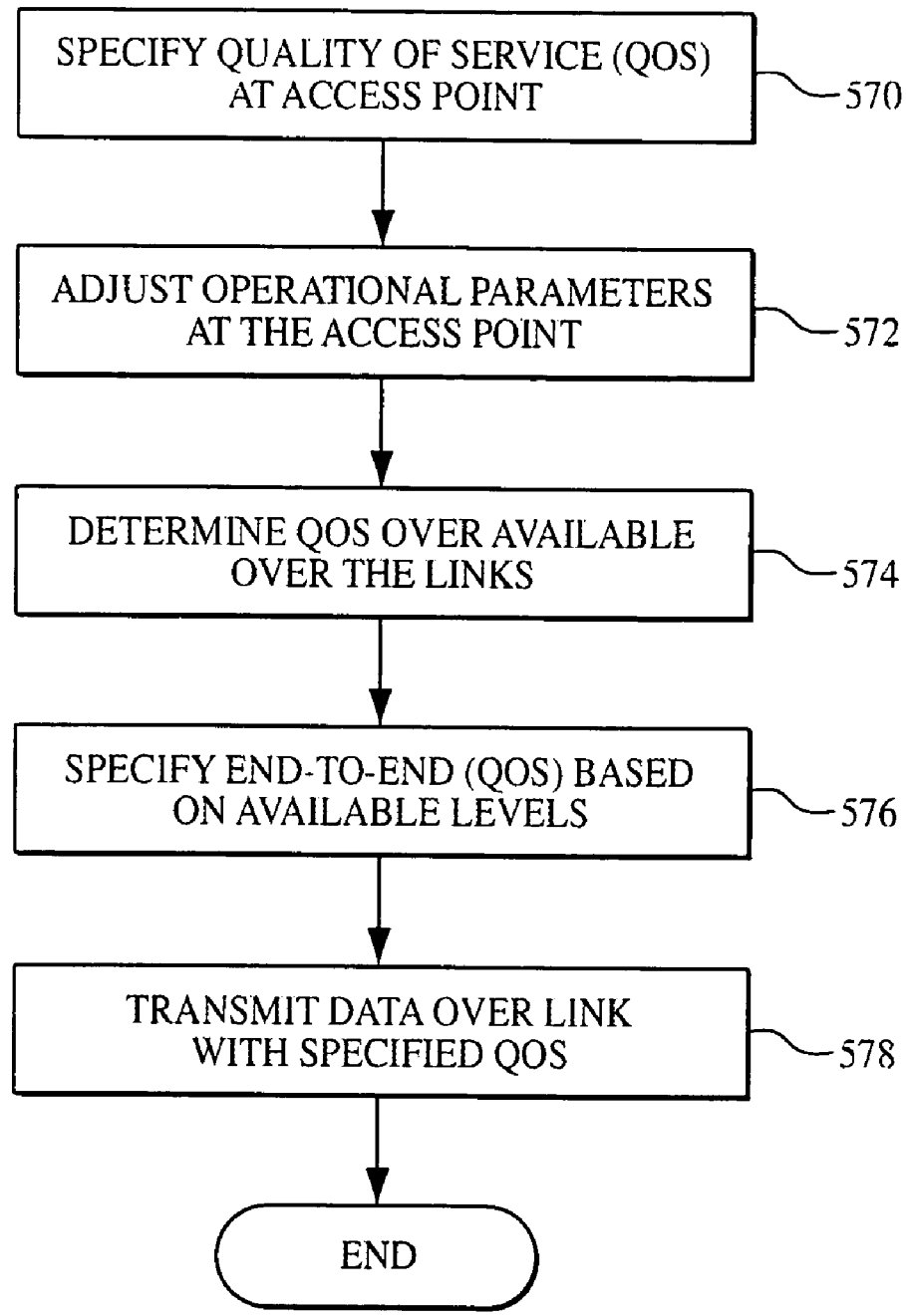
FIG. 5 is a flow chart illustrating a method of establishing quality of service over a communication channel in accordance with an embodiment of the invention.

FIG. 5 is a flow chart illustrating a method of establishing quality of service (QOS) over a communication channel in accordance with an embodiment of the invention. This aspect of the invention provides a configurable access point (AP) allowing a user to match the QOS provided over a channel in a WLAN with the QOS provided over the packetized wired network connected to the WLAN. QOS is based on the idea that transmission rates, error rates, and other characteristics can be measured, improved, and, to some extent, guaranteed in advance. The QOS is set at the AP in order to substantially achieve a uniform QOS from a source node to a destination node. The QOS parameter is specified 570 at the AP associated with the wireless channel connected to the mobile unit at a source node. Once the QOS parameter is set, the MAC and PHY level operation parameters are specified 572 at the AP and at the mobile unit so that the specified QOS over the wireless link is enabled. The MAC layer corresponds to the data link layer and the PHY layer corresponds to the physical layer. These layers correspond closely to the lowest layers of the ISO Basic Reference Model of OSI, i.e., the physical layer and the data link layer. Then, the QOS levels that are available over the wired communications link and the wireless link, if applicable, at the destination are determined 574. Next, the end-to-end QOS levels based upon the available levels over the links are specified 576. Once the QOS parameters have been set, the mobile unit is able to transmit 578 messages from the source to destination with the specified quality of service at each link.

Figure 5A:
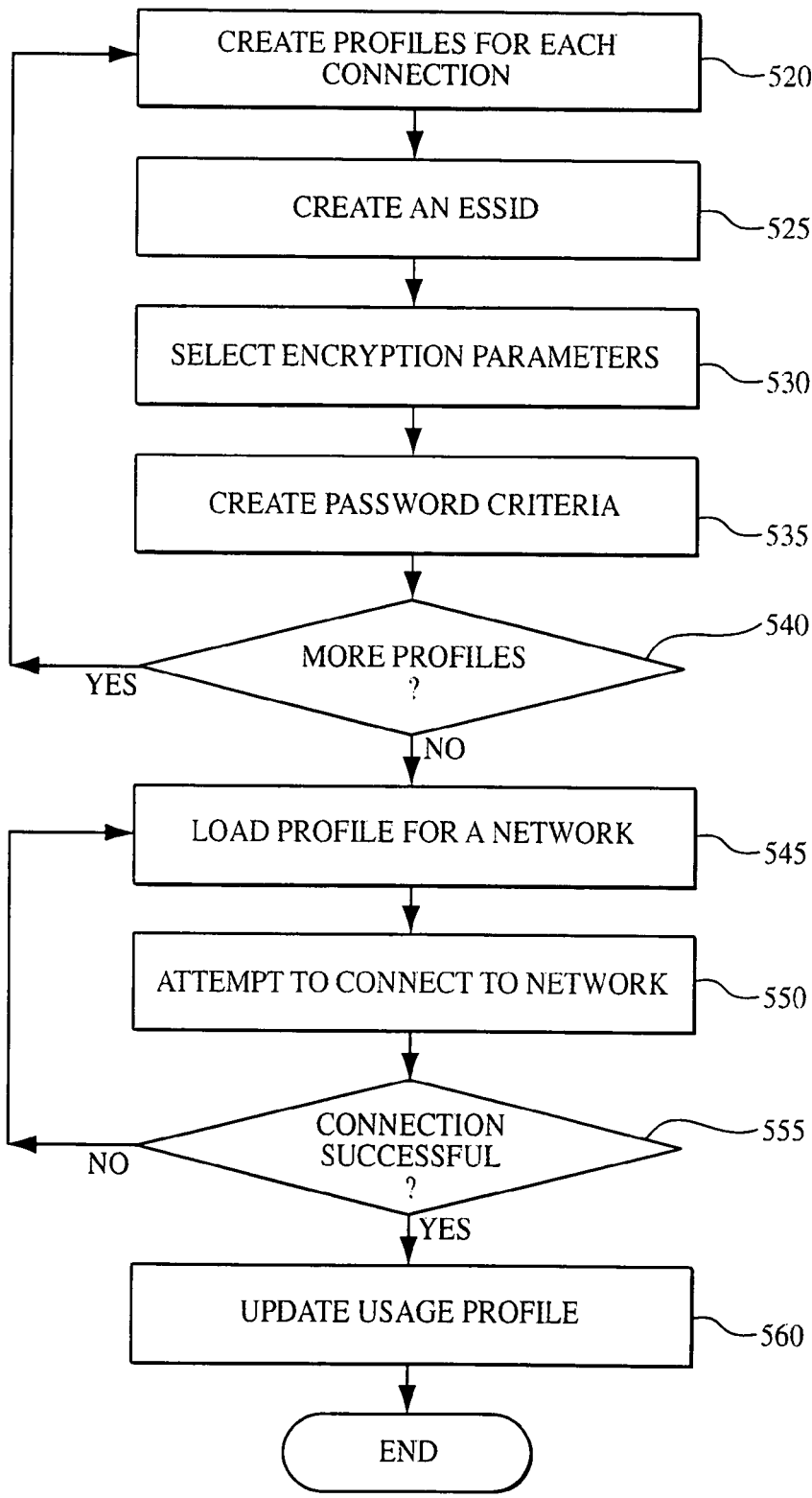
FIG. 5A is a flow chart illustrating a method of creating and using profiles in accordance with an embodiment of the invention.

FIG. 5A is a flow chart illustrating a method of creating software configuration profiles enabling portable terminals to operate over different WLANs. A particular embodiment and a more detailed discussion of this method are provided below with corresponding screenshots. Configuration information is contained in profiles created 520 by the user during the initialization process. An extended server set identifier (ESSID) is created 525 and stored as part of the profile. The ESSID is used to determine the WLAN service area when the terminal is communicating with the network and provides security features. Several encryption settings including the type of encryption algorithm are available 530 providing the terminal with added security capability. The profile also contains password information which is entered 535 by the user. Several profiles may be created 540 by the user reflecting different WLAN connections. Once the profiles are created, they are loaded 545 onto or created on the portable terminal based upon a usage profile, or a predetermined criteria or priority order. The profiles each correspond to a unique service provider, communication protocol, or operations parameter. If attempts 550 to associate with the network fail 555, a different profile is loaded onto the terminal, and an attempt at a connection to and association with the network is made. After the association is established, the usage profile is updated 560 so that future attempts at WLAN network association are made in priority order based on most recent usage.

In one embodiment, the program is implemented in two DLLs. The first DLL is the name space extension DLL. The name space extension DLL is responsible for registering itself with the system and exposing the component object model (COM) interface. The COM interface encapsulates commonly used functions and services in the Windows® environment. As the COM interfaces are called by the Windows Explorer shell, the auto configuration program name space extension reads the program's registry area and creates the user interface representation of the data in the registry. Responding to user input, the name space extension calls a WLAN Profile Wizard DLL to execute the create, copy, delete, rename and edit functions required by the program.

A user can use the Wizard interface to help in the creation and management of the WLAN profiles. To use the Wizard, the user opens the configuration application on the remote unit 15 and clicks on an Add New Profile icon or clicks on an existing profile. The WLAN profile Wizard is launched as part of the Windows® Name Space Extension application.

Once the Wizard is launched, it takes on a traditional windows wizard appearance. This wizard is a series of presentations or pages, displayed in a secondary window that helps the user through the WLAN profile creation task. The pages include controls that gather input from the user. The input is then used to complete the profile creation task for the user. Once the new profile is created, it appears in the namespace window client area.

Figure 6:
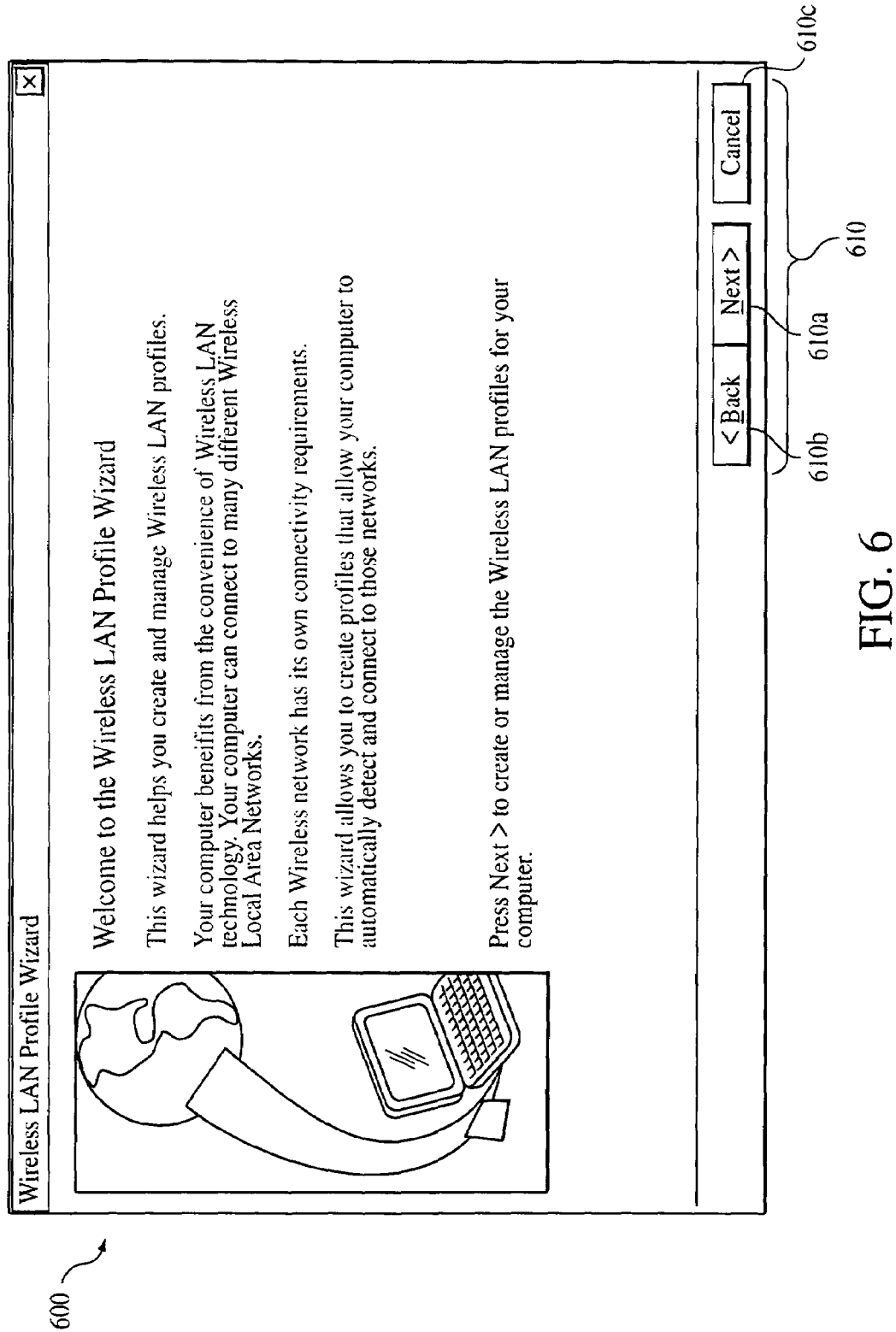
FIG. 6 illustrates a screen shot of an implementation of a configuration window of the invention.

FIG. 6 is a screen shot of an implementation of a profile wizard 600 in the Windows ® environment. At the bottom of the Wizard window, command buttons 610 allow the user to navigate through the wizard. The Next/Back 610a/610b buttons moves to the next page in a sequence or to a previous page in the sequence, maintaining whatever settings the user provides in the previous pages. The Next button 610b applies user-supplied or default settings from all pages and completes the profile task. The Cancel 610c button discards any user-supplied settings, terminates the process and closes the Wizard window.

The Wizard has two major functions. The first function is the creation and editing of profiles that are stored in the Windows registry for the local machine. The second function is the creation and exporting of profiles that are remotely installed on another computer.

Profile Management

Figure 6A:
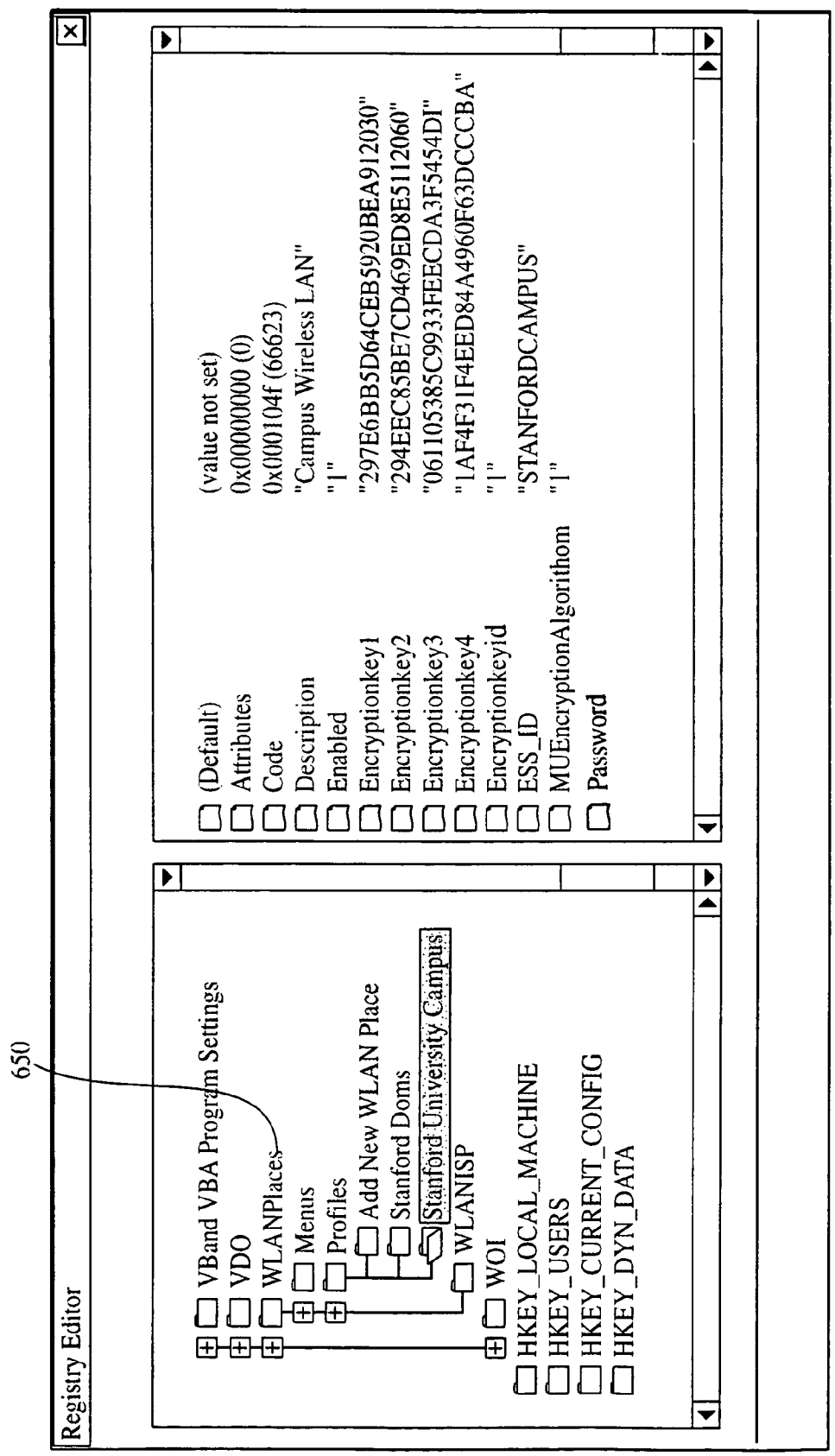
FIG. 6A illustrates a screen shot of the Windows® registry in which profiles are stored.

As shown in FIG. 6a, all profiles created and managed by the WIZARD DLL are stored in the Windows® registry 640 under a unique data identification key 650. For example, the registry key can be located at ..\WLANPlaces\Profiles 640. Each subkey below the profiles subkey is the actual name of the profile as typed by the user. Thus, a virtually infinite number of profiles are possible. However, as a practical matter a typical user will implement typically, ten or less WLAN profiles. When the profile Wizard creates a new profile in the registry, it first checks to see if a profile with the name the user is assigning to the new profile already exists. If the profile already exists, the user is prompted to select a unique name for the new profile. All profile properties are saved inside the newly named registry subkey.

During the initialization process of the name space window, the name space DLL creates a list of all known profiles by name. As mentioned above, duplicate profile names are not allowed. In addition, the name space window does not present features to the user that require a pre-existing profile. Therefore, if no preexisting profiles are found in the registry, the certain functions that are normally available in the name space window (e.g., copy and paste functions) are not accessible to the user.

Figure 7:
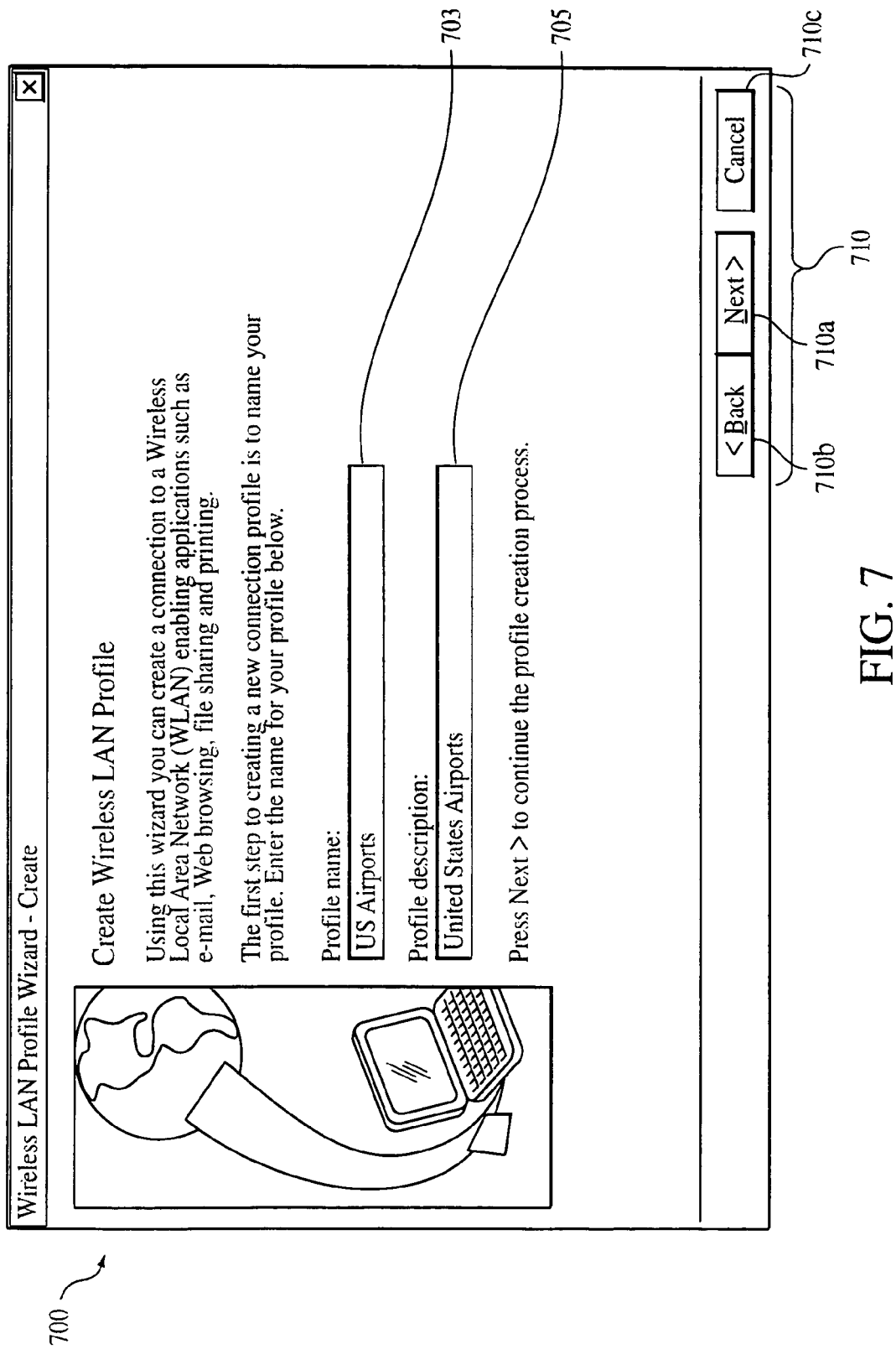
FIG. 7 illustrates a screen shot of an implementation of a profile creation window of the invention.

FIG. 7 illustrates a screen shot of an implementation of a profile creation window. In this implementation, the user is presented with a profile name field 703 and a profile description field 705. The user can type a meaningful name for the profile they are about to create. In an embodiment, names can be up to 128 characters long and can contain any printable character. However, the Wizard compares the names irrespective of case when determining if a duplicate name exists. Names are stored in the registry under the value key "Name", as they are typed by the user. The user can also enter a meaningful description of the profile in the description field. The user clicks the Next button 710a to continue the creation process, or presses the Cancel button 710c to close the Wizard. The user has the option of returning to a previous window using the Back button 710b. An export function is called when the Name Space Extension adds a new profile.

Figure 8:
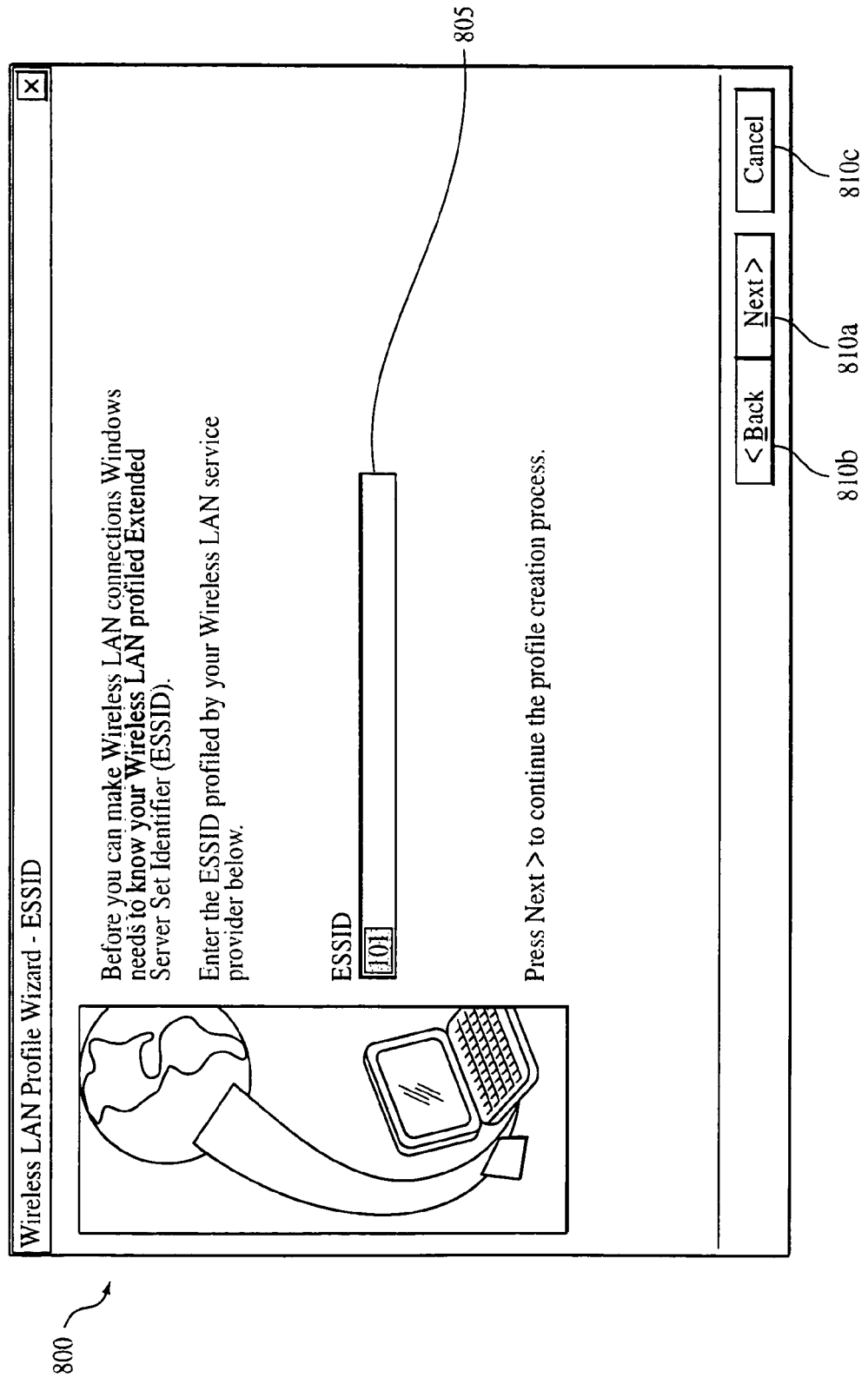
FIG. 8 illustrates a screen shot of an implementation of an extended server set identifier creation window.

FIG. 8 illustrates a screen shot of an implementation of identification screen 800. The identification screen contains a single WLAN profiled extended server set identifier (ESSID) field 805. The ESSID is used to determine the WLAN service area when connecting to the network. The ESSID can be zero to thirty-two characters long. If the value cannot be determined, "101" is the default value. The ESSID is stored in the registry area for the profile under the value key "ESS_ID". The ESSID is the first step in creating an encrypted communication link between the remote unit 15 and the associated network. Therefore, when the remote unit 15 announces its presence in a WLAN, it is only acknowledged and allowed a communication link if it communicates the proper ESSID. Even if there are other unrelated WLANs with the same channel frequencies in the vicinity of the WLAN and related remote unit 15, the communication link will only be established with the remote unit 15 having the correct ESSID. This prevents unauthorized or even hostile clients from establishing a communications link. The user presses the Next button 810*a* to continue the creation process, or presses the Cancel button 810*c* to close the Wizard. The user has the option to return to a previous window using the Back button 810*b*.

Figure 9:
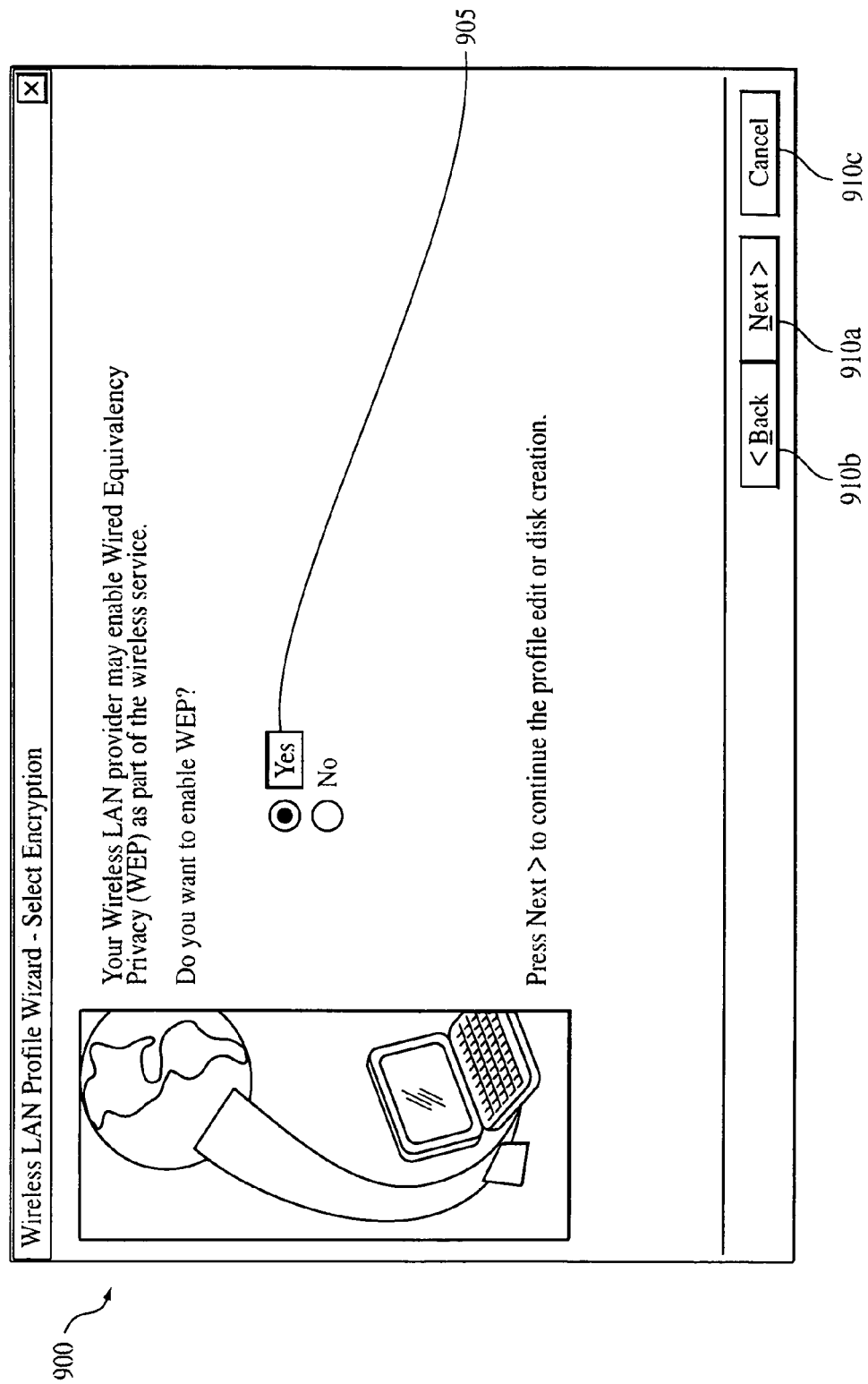
FIG. 9 illustrates a screen shot of an implementation of an encryption selection window.

FIG. 9 illustrates a screen shot of an implementation of a wireless equivalency privacy (WEP) inquiry page 900. This page follows the ESSID page and prompts the user if the WLAN to which they intend to connect uses WEP (wireless equivalency privacy). In an embodiment, the user can select from two radio button 905 options, Yes or No. The user can press the Next button 910*a* to continue the process. If the user chooses "yes", an encryption property page (see FIG. 10) is displayed when the Next button 910*a* is clicked. The user has the option to click the Cancel button 910*c* and exit the Wizard or click the Back button 910*b* to return to a previous window.

Figure 10:
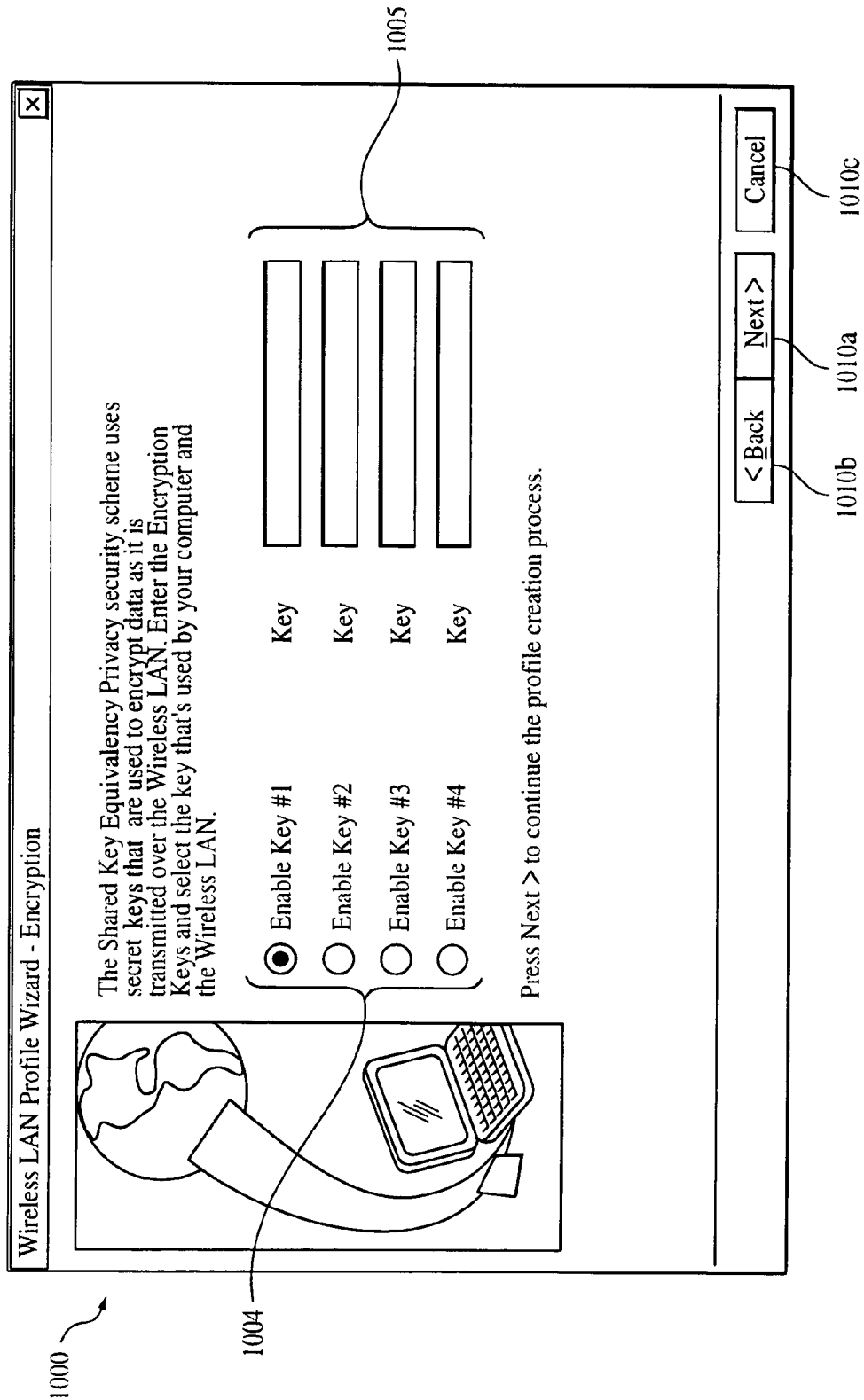
FIG. 10 illustrates a screen shot of an implementation of an encryption window.

FIG. 10 illustrates a screen shot of an implementation of an encryption property page 1000. The user can enter encryption key values for several keys (typically four) and select a key index which will be used while communicating on the network. Encryption keys are validated for length and content. The user can enable the desired key by clicking in Enable Key fields 1004. The user can enter the key value in the key fields 1005. After the user chooses the desired encryption settings, the user can click the Next button 1010*a* to accept the encryption and move to the next window. The user can also click the Back button 1010*b* to move to a previous window, or click the Cancel button 1010*c* to exit the Wizard.

The values in the registry are encrypted using a proprietary encryption algorithm to protect their privacy. Referring again to FIG. 9 (WEP), if the user chooses not to enable WEP, then the mobile Unit (MU) Encryption Algorithm setting in the registry is set to "Open System" (no encryption). The user can then click the Next button 910*a* to continue the process or click Cancel button 910*c* to exit the wizard.

Figure 11:
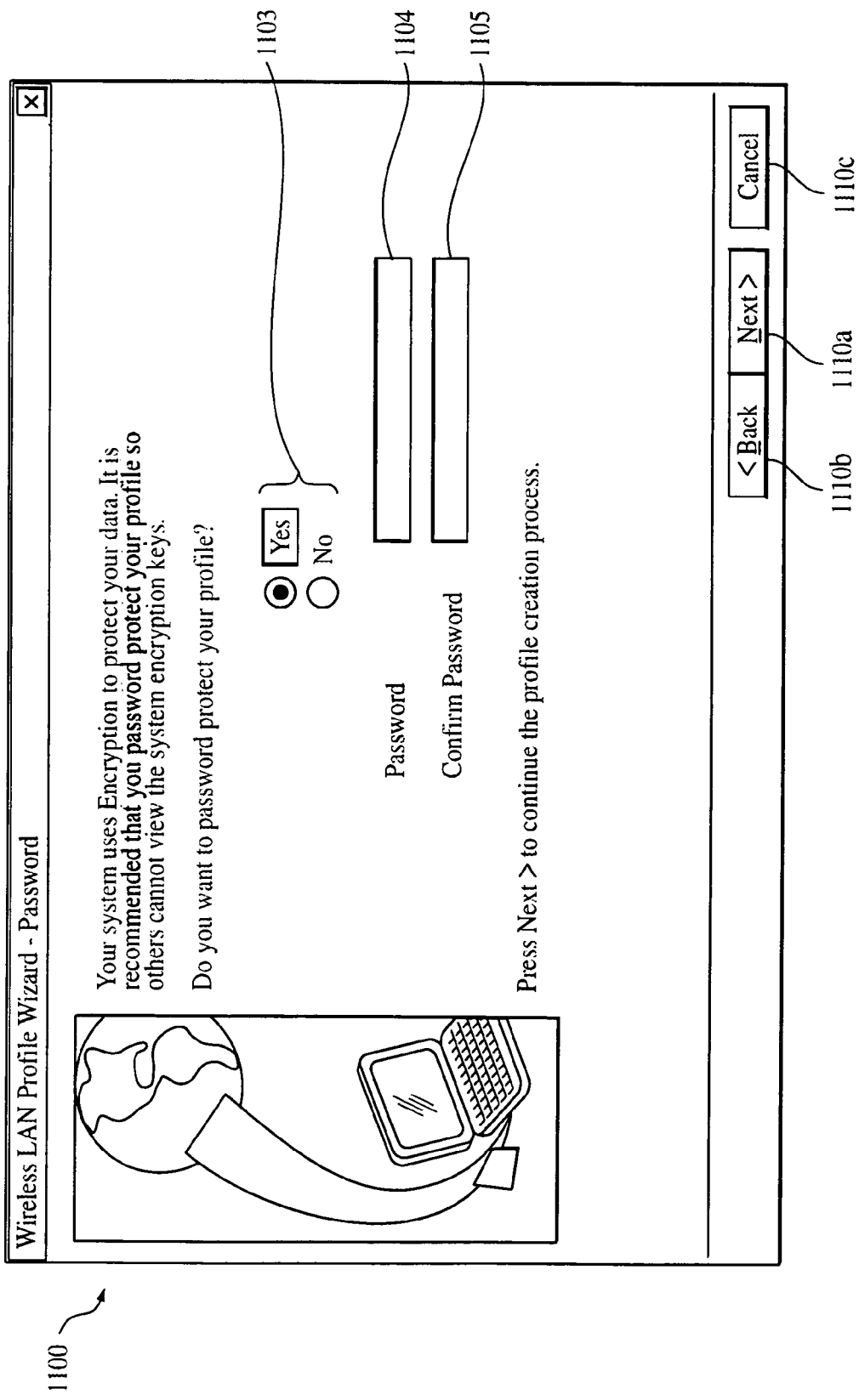
FIG. 11 illustrates a screen shot of an implementation of a profile password select window.

FIG. 11 illustrates a screen shot of an implementation of a password select screen 1100. The user has the option to password protect the profile. The user can optionally select whether or not the user desires to have the profile password protected by choosing "yes" or "no" in a password select field 1103. If the user chooses a password, then the user enters the password in a password field 1104. The user confirms the password in a confirmation field 1105. In an implementation, the password select page uses standard Windows® password change techniques.

Figure 12:
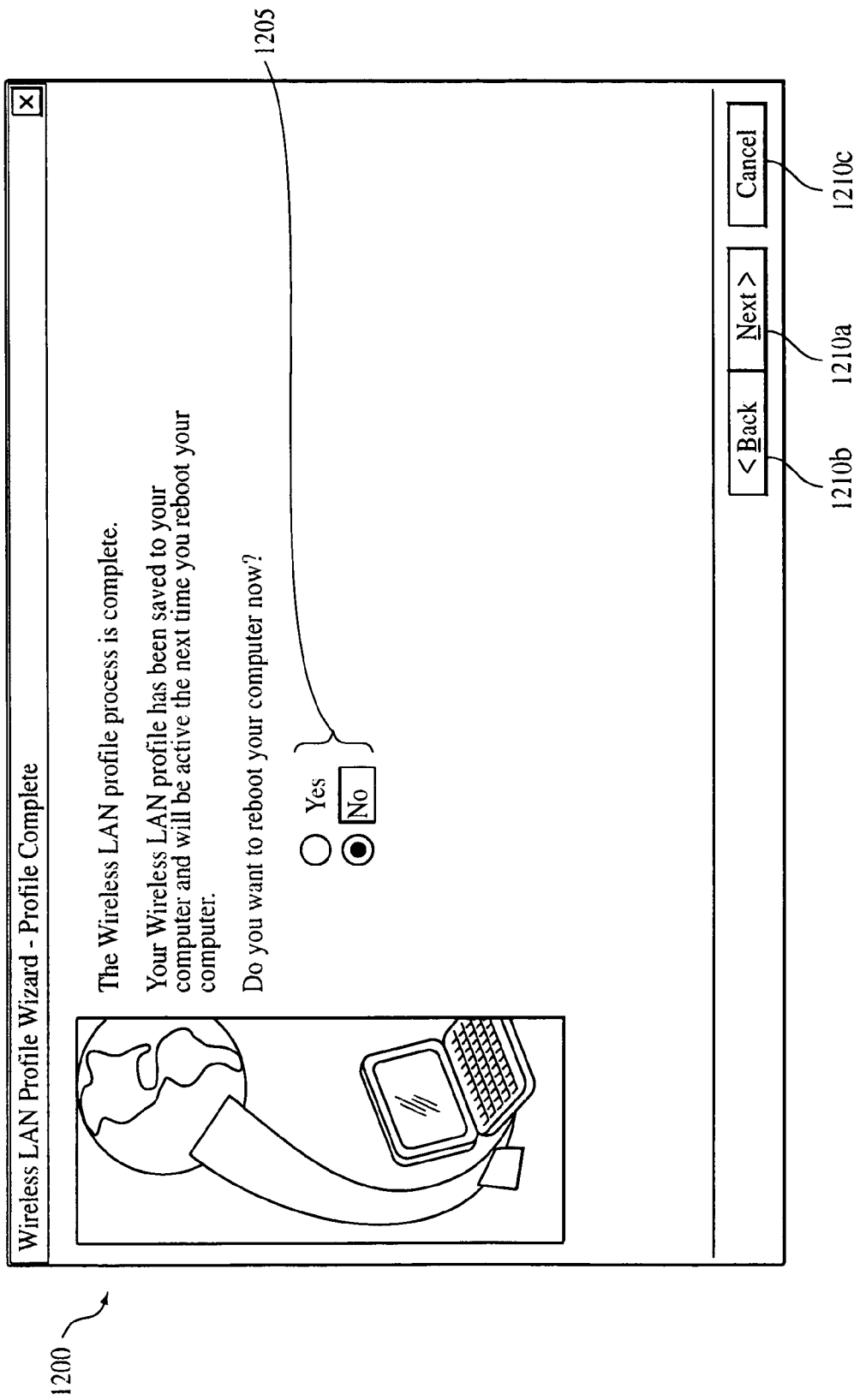
FIG. 12 illustrates a screen shot of an implementation of a profile finish window.

FIG. 12 illustrates a screen shot of an implementation of a finish window 1200. The page communicates to the user that the wizard is finished with the configuration process and that a profile has been saved and becomes active the next time the user boots the remote unit 15. The user can decide whether to reboot the remote unit 15 by choosing "yes" or "no" in a selection field 1205. The user can choose to go back to a previous window by clicking a Back button 1210*b* or to exit the Wizard by clicking a Cancel button 1210*c*. The user can click a Finish button 1210*a* to complete the process, optionally rebooting the remote unit 15.

The user of the remote unit 15 can optionally copy an existing profile. Copying existing profiles is similar to copying a file on a typical computer. In one embodiment, on the Windows® platform, using the Windows® shell commands that are used to copy files, profiles are copied. The user can also copy a profile using the Edit menu on the WLAN configuration application window. The new profile is assigned a new name based on the old name, and the name can be edited the same way a Windows® file name is edited. To edit the properties of a newly copied profile, the user double clicks an icon associated with the profile to launch the edit portion of the Wizard. Subsequently, the process is similar to the Edit profile process described above. The newly copied profile is stored in its own location in the registry. The Wizard DLL exports the function WLANProfileWizardCopy for use when the Name space extension is to copy an existing profile.

The user can rename an existing profile in a manner similar to renaming a file on a computer using Windows® shell commands (using clicking steps). The user can also rename a profile using the Edit menu in the WLAN configuration application window. The renamed profile gets the new name if the name does not already exist. If a duplicate name is entered, an error message is generated and the profile is not renamed. The Wizard DLL exports the function WLANProfileWizardRename for use when the name space extension is to rename an existing profile.

To delete a profile, a similar process as for deleting a file on a computer is used. However, the removed profile does not go into the recycle bin as it does on when a file is deleted on the Windows® platform. The profile can be deleted by either highlighting the profile icon and hitting the delete key or by using the edit menu in the WLAN configuration application window. The user is prompted for a confirmation prior to deleting the profile. The Wizard DLL exports the function WLANProfileWizardDelete when the name space extension is to delete a profile. In an implementation, there is no undo function after the profile has been removed.

Figure 13:
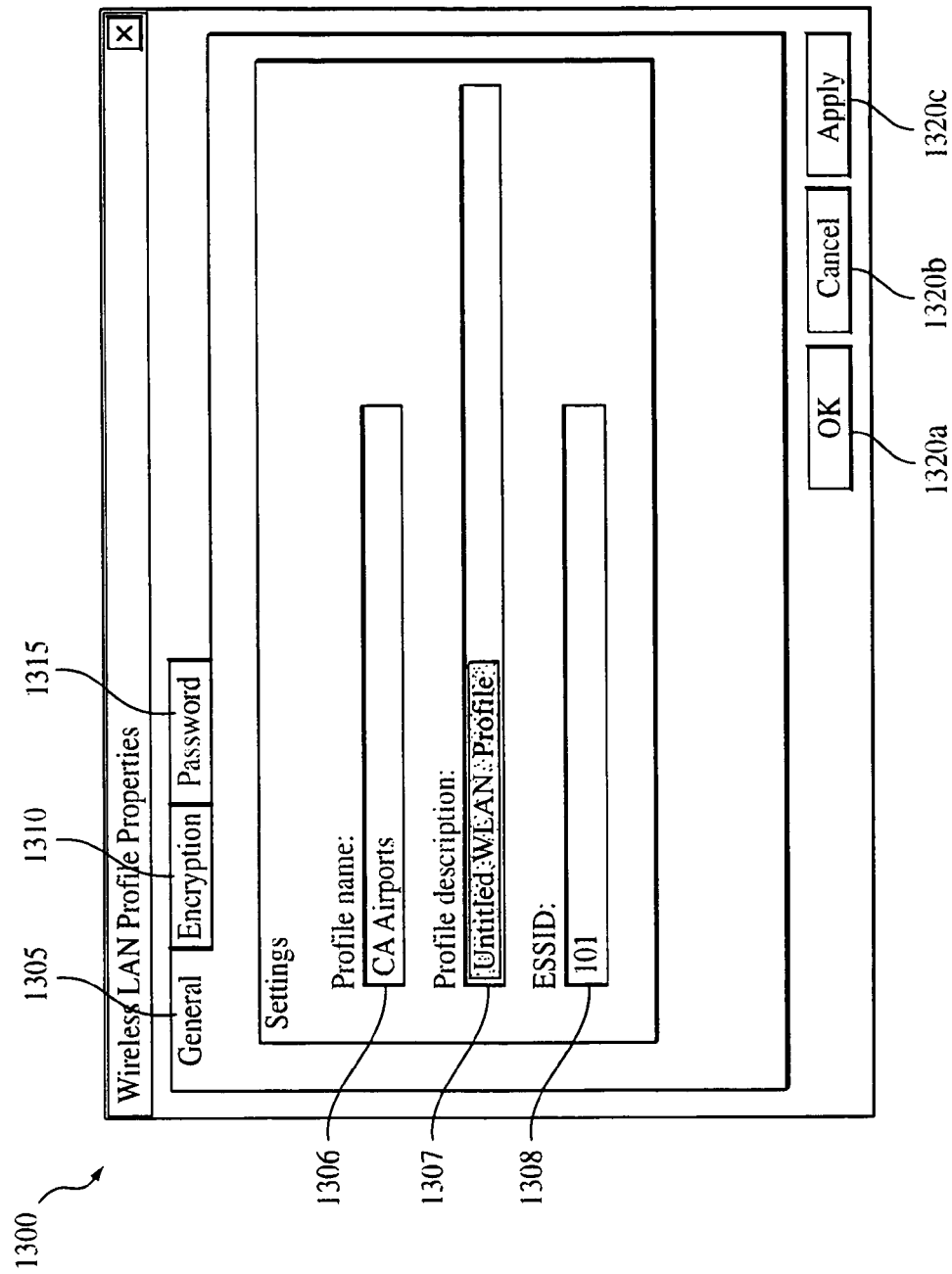
FIG. 13 illustrates a screen shot of an implementation of a profile properties window.

To edit an existing profile, the wizard displays a series of property pages similar to choosing properties from a menu in a Windows® application. The user may have to enter a valid password if one is required by the profile in order to edit. The user can edit any of the information for the profile in the properties pages. FIG. 13 illustrates a screen shot of an implementation of a properties window 1300. Three tabs 1305, 1310, 1315 allow the user access to general, encryption and password properties respectively. In one embodiment, under the general tab, the user can edit the profile name in a profile name field 1306, the profile description in a profile description field 1307, or the ESSID in an ESSID field 1308. Under the encryption tab 1310, the user can change any of the properties involving the encryption such as the encryption key number (1004 in FIG. 10) or the encryption key (1005 in FIG. 10). Under the password tab 1315, the user can change the password, if one was chosen, (see FIG. 11), or choose a password if a password was not previously chosen. The user can edit the profile and click an OK button 1320*a*, or cancel the operation by clicking a Cancel bottom 1320*c*. If the user made any changes to the properties of the profile, the user can click an Apply button 1320*b* to write the changes to the registry. The wizard DLL exports the function WLANProfileWizardEdit when the name space extension is to edit an existing profile.

Unattended Installation Creation

The WLAN wizard has the ability to use the profiles to create an unattended WLAN driver installation process. Once the creation process is completed, a single WLAN driver with, typically, multiple profiles is created. The process of the invention can be used to deploy large numbers of configured WLAN computers with multiple profiles, or a single profile, saving an enormous amount of software installation labor and eliminating installation errors. The process can be loaded onto a storage medium and can be distributed as needed.

The creation of the installation process can be implemented from the WLAN configuration application menu, choosing the "create installation" item. The wizard steps the user through the process of selecting the profiles the user wants to add to the installation process storage medium (for example on a floppy disk) and clicks the next button. The user chooses a destination device and path for the newly created installation and completes the process by clicking the finish button. In an implementation, an image disk is created.

One example of an automatic installation is through creation of an installation program and corresponding profile as a web site through the use of a scripting language.

A WLAN driver sits between the registry containing the profiles and the remote unit 15 hardware. The driver uses a prioritized discovery process for submitting profile information to the adapter firmware and checking for a successful association between a profile and the WLAN which allows automatic connection to the WLAN to be completed. If an association is established a match is considered found. If the association fails, the discovery process continues to the next highest priority profile in the driver's list of profiles. The process continues until the list is exhausted or a successful association takes place.

Once a successful association takes place the driver increments the priority counter stored for the selected profile in the registry. The counter is stored as a DWORD allowing it to become very large. The value of the counter determines the priority of the profile in the driver's list of profiles during the boot process. Therefore, the more often the particular network profile is associated during the boot process, the higher the priority becomes. The driver also stores the name of the selected profile for use by other programs. The profiles are stored redundantly in the adapter's parameter area. The driver reads through the profiles below its parameter area and collects the profile information for each profile.

Another feature of the present invention is to provide a graphical user interface which enables a user to develop a network architecture or to specify operational parameters for a mobile unit through the use of icons, buttons, meters, slides, or other objects implemental on an interactive display. More particularly, the present invention may also provide an interactive display to the user depicting a graph of the network architecture, wherein points represent mobile units, access points, network nodes, bridges, routers, gateways, hubs, or other well known designated network units together, while lines represent channels or other connectivity media and the user may define the architecture by pointing and clicking, or drag and dropping, on such objects on the display as is well known in the art. Network parameters such as shared encryption keys, access or authentication ranges of mobile units, security levels, quality of service levels, delay tolerances, addressing schedules and the like may be specified for each network node and/or link so as to achieve the desired network architecture. One such architecture is specified by a user or network manager, it may be exported or broadcast as a software file to the actual various network elements represented, along with activation schedules, to indicate the duration, context, or other bounds with which the network is to be so configured.

In addition to the ad hoc network configuration by a user, by interacting with a graphical user interface, the present invention also allows the automatic reconfiguration of a network "on the fly", or adaptively in response to changing traffic patterns, instructions in signal protocols, or the like. Resident software modules at each network node may adaptively configure the network node or channel links attached to the network node, according to levels or type of incoming traffic, or in response to signaling protocols. Such adaptation may take place through the use of separate signaling channels or through the use of management packets addressed to a specific network node and designed to reconfigure that network node in connection with a specific session or traffic condition. In addition to the foregoing, the network node may also be reconfigured for a series or set of packets, i.e. in the context for providing higher quality of service to particular identified set of packets while providing normal quality of service to all other packets. One application of the foregoing is to achieve uniformity in the quality of service from end to end, along each network link from source to destination regardless of the particular packet path chosen or network nodes encountered during the transmission from source to destination. The exporting or automatic installation of software modules in network nodes or mobile units according to the present invention is one suitable method for achieving such "on the fly" adaptive network configuration.

Various aspects of the techniques and apparatus may be implemented in digital circuitry, or in computer hardware, firmware, software, or in combinations of them. Apparatus of the invention may be implemented in computer products tangibly embodied in a machine-readable storage device for execution by a programmable processor. The foregoing techniques may be performed, for example, by a programmable processor executing a program of instructions to perform functions of the invention by operating on input data and generating output. The methods may advantageously be implemented in one or more computer programs that are executable on a programmable system including at least one programmable processor coupled to receive data and instructions from, and to transmit data and instructions to, a data storage system, at least one in/out device, and at least one output device. Each computer program may be implemented in a high-level procedural or object-oriented programming language, or in assembly or machine language if desired; and in any case, the language may be compiled or interpreted language. Suitable processors include, by way of example, both general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in, specially designed application-specific integrated circuits (ASICS).

A number of embodiments of the invention have been described. Nevertheless, it will be understood that various modifications may be made without departing from the spirit and scope of the invention. For example, in addition to the operation parameters associated with a WLAN connection (such as ESSID, encryption key, etc.) provided by current WLAN specifications, various additional properties, such as encryption algorithms, quality of service parameters, etc. may be autoconfigured as such features and properties are implemented on WLANs. Accordingly, other embodiments are within the scope of the following claims.

What is claimed is:

1. A software-implemented method of configuring a computer to associate with one or more wireless networks through a corresponding wireless communication link, comprising:
   creating a plurality of computer profiles for connection to at least one of the wireless networks, wherein each of the plurality of computer profiles includes a network identifier corresponding to a different wireless network;
   using at least one of the plurality of computer profiles to cause the computer to recognize the at least one of the wireless networks;
   creating the wireless communication link between the computer and the at least one of the wireless networks;
   associating each computer profile with a wireless network based on a priority value until there is a successful association or a list of profiles is exhausted, incrementing a counter associated with a selected computer profile each time that computer profile is matched to a network of the one or more wireless network; and
   utilizing a computer value to prioritize subsequent associations of the plurality of computer profile and the one or more wireless networks.

2. The method of claim 1, further comprising:
   using variable network parameters such as encryption key status, frequency, and power requirements to create the at least one of the plurality of computer profiles.

3. The method of claim 1, wherein the software is integrated into an operating system of the computer.

4. The method of claim 1, further comprising:
   encrypting data passing over the communication link between the computer and the at least one of the networks.

5. The method of claim 1, further comprising:
   programming the computer to contain said plurality of computer profiles to recognize and connect with multiple unrelated networks of the one or more wireless networks.

6. The method of claim 5 further comprising:
   creating an additional computer profile; and
   associating said additional computer profile to the one or more of the wireless networks.

7. The method of claim 1, further comprising:
   storing the name of an associated computer profile for use by other programs.

8. A method of configuring a processor-based system for communications, the method comprising:
   storing a plurality of network profiles to allow connections to one or more wireless networks available to the processor-based system, wherein each of the plurality of network profiles is associated with a different available wireless network;
   selecting at least one of the plurality of network profiles based an at least one of the wireless networks available to the processor-based system;
   establishing a communication link between the processor based system and at least one of the wireless networks available to the processor-based system based on the selected network profile;
   incrementing a counter associated with a selected network profile each time that profile is matched to a network of said one or more wireless networks; and
   utilizing the counter value to prioritize subsequent associations of the plurality of computer profiles and the network.

9. The method of claim 8, further comprising:
   using variable network parameters at least one of encryption key status, frequency, and power requirements to create the at least one of the network profile.

10. The method of claim 8, wherein the method is performed by an operating system of the processor-based system.

11. The method of claim 8, further comprising encrypting data passing over the communication link between the processor-based system and the at least one of the network.

12. The method of claim 8, further comprising allowing the processor-based system to use one or more of the plurality of network profiles to enable communications with one or more of the wireless networks available to the processor-based system.

13. The method of claim 8, wherein selecting the at least one network profile comprises selecting the at least one of the plurality network profiles based on a priority scheme.

14. The method of claim 13, wherein selecting the at least one network profile based on the priority scheme comprises selecting the at least one network profile based on a communication characteristic of one of plurality of wireless networks associated with the network profile.

15. The method of claim 13, wherein the priority scheme is based on at least one of an availability of the wireless network, quality of service associated with the network, frequency of use of the wireless network by the processor-based system, and last usage of the network by the processor-based system.

* * * * *